(12) United States Patent
Hsu et al.

(10) Patent No.: US 10,437,767 B2
(45) Date of Patent: Oct. 8, 2019

(54) EXPANDABLE INTERFACE BOARD

(71) Applicant: Innodisk Corporation, New Taipei (TW)

(72) Inventors: Che-Ming Hsu, New Taipei (TW); Cheng-Chun Chang, New Taipei (TW)

(73) Assignee: INNODISK CORPORATION, New Taipei (TW)

( * ) Notice: Subject to any disclaimer, the term of this patent is extended or adjusted under 35 U.S.C. 154(b) by 40 days.

(21) Appl. No.: 15/702,644

(22) Filed: Sep. 12, 2017

(65) Prior Publication Data

US 2018/0329849 A1 Nov. 15, 2018

(30) Foreign Application Priority Data

May 11, 2017 (TW) .............................. 106115678 A

(51) Int. Cl.
*G06F 21/88* (2013.01)
*G06F 13/40* (2006.01)
*G06F 13/42* (2006.01)

(52) U.S. Cl.
CPC ...... *G06F 13/4068* (2013.01); *G06F 13/4022* (2013.01); *G06F 13/4282* (2013.01); *G06F 2213/0032* (2013.01)

(58) Field of Classification Search
None
See application file for complete search history.

(56) References Cited

U.S. PATENT DOCUMENTS

| 2010/0275037 A1* | 10/2010 | Lee ........................ G06F 13/385 713/189 |
| 2011/0219159 A1* | 9/2011 | Park ........................ G06F 13/00 710/300 |
| 2013/0304952 A1* | 11/2013 | Aggarwal ............... G06F 3/067 710/104 |
| 2018/0356865 A1* | 12/2018 | Chang ..................... G06F 1/185 |

* cited by examiner

*Primary Examiner* — Hyun Nam
(74) *Attorney, Agent, or Firm* — Chun-Ming Shih

(57) ABSTRACT

The present invention provides an expandable interface board. The interface board is an interface board conforming to M.2 interface protocol specification, comprises a plurality of data storage elements, a data transmission interface, a controller, and at least one connection seat. The data transmission interface comprises a plurality of first interface pins and a plurality of second interface pins. The interface board is electrically connected to an external electronic device via the connection seat. Wherein the first interface pins are defined for transmitting data signals of the data storage elements, and the second interface pins are defined for transmitting data signals of the external electronic device. Accordingly, an electronic product applied by the interface board is able to expand it's functions by the external electronic device connected to the connection seat of the interface board.

9 Claims, 8 Drawing Sheets

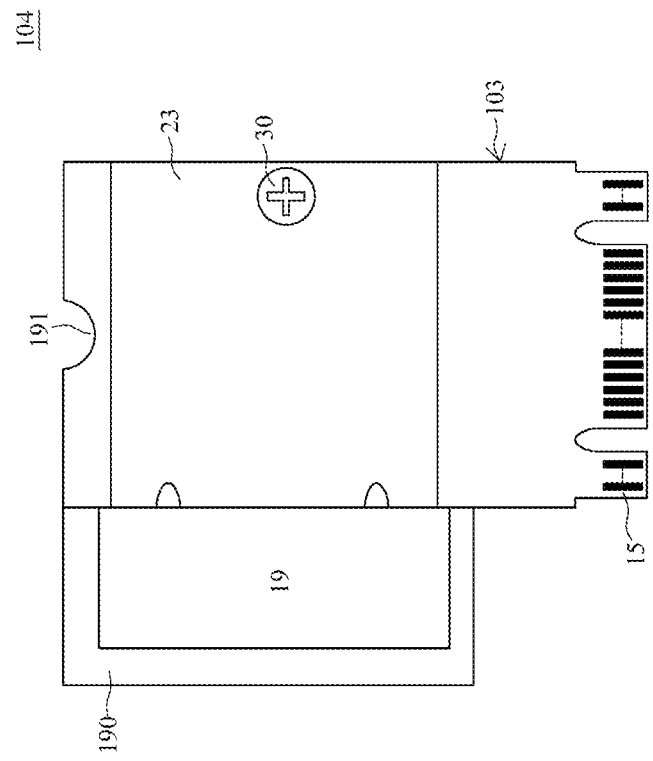

EXPANDABLE INTERFACE BOARD

This non-provisional application claims priority claim under 35 U.S.C. § 119(a) on Taiwan Patent Application No. 106115678 filed May 11, 2017, the entire contents of which are incorporated herein by reference.

FIELD OF THE INVENTION

The present invention relates to an interface board, more particularly, to an expandable interface board.

BACKGROUND

M.2 is a transmission interface of the new standard protocol established by PCI-SIG and SATA-IO associations. M.2, originally known as the NGFF (Next Generation Form Factor), is now called M.2. M.2 interface can support the standard protocols of SATA, USB and PCIe, has a variety of dimensions and the advantage of fast transmission speed, and can be applied to various kinds of expansion cards like the solid state disk (SSD), WIFI, Bluetooth and near field communication (NFC), etc.

Currently, the electronic product is usually only configured with a single M.2 interface connector. If this single M.2 interface connector has been occupied by a traditional M.2 interface board, the electronic product will not be able to insert the other M.2 interface board. Furthermore, the current electronic product is designed towards the characteristics of light, thin, short and small; therefore, the smaller-sized electronic product is only provided with a few connectors capable of inserting the functional devices, for example, display interface card, network interface, data storage devices, etc. The expansion of the functions of the smaller-sized electronic product is limited because the smaller-sized electronic product lacks of the connectors.

For the reason, the present invention provides an expandable interface board, when the interface board is configured in an electronic product, the electronic product is able to connect at least one functional electronic device by the configuration of the interface board so as to expand the functions of the electronic product, which is the object to be achieved by the present invention.

SUMMARY

It is one object of the present invention to provide an expandable interface board, which is an interface board conforming to M.2 interface standard protocol. The M.2 interface board is provided with at least one connection seat thereon. When the M.2 interface board is applied in an electronic product, the electronic product may be connected with at least one functional electronic device so that the electronic product configured with the M.2 interface board can be expanded.

It is another object of the present invention to provide an expandable interface board, in which the interface board is an interface board for storing data. The interface board is provided with a plurality of data storage elements and a RAID module thereon. The RAID module can be for backing up the data stored in the data storage elements to the external electronic device.

It is another object of the present invention to provide an expandable interface board, in which the interface board is provided with a connection seat conforming to M.2 interface standard protocol. The interface board can be connected with another interface board conforming to M.2 interface standard protocol by the M.2 interface connection seat.

To achieve the above object, the present invention provides an expandable interface board, conforming to M.2 interface standard protocol, comprising: a plurality of data storage elements; a data transmission interface comprising a plurality of first interface pins and a plurality of second interface pins; a controller connected to the data storage elements and the data transmission interface; and at least one connection seat connected to the controller, the connection seat is allowed for inserting an external electronic device, wherein the first interface pins are defined for transmitting data signals of the data storage elements, the second interface pins are defined for transmitting data signals of the external electronic device.

In one embodiment of the present invention, wherein the data storage elements are flash memory elements.

In one embodiment of the present invention, wherein the connection seat comprises a plurality of connection seat pins connected to the second interface pins of the data transmission interface, the connection seat pins of the connection seat and the second interface pins of the data transmission interface are used for transmitting the data signals of the external electronic device.

In one embodiment of the present invention, wherein the connection seat is a connection seat conforming to SATA interface standard protocol, USB interface standard protocol, NanoPitch (OCuLink) interface standard protocol, mSATA interface standard protocol, PCIe interface standard protocol, Slimline SAS interface standard protocol, or other interface standard protocol.

In one embodiment of the present invention, wherein the expandable interface board is further provided at a side thereof with an expansion area, and further provided at other side thereof with a hole, the connection seat of the expandable interface board is a connection seat conforming to M.2 interface standard protocol, and is disposed on the expansion area, the external electronic device is provided at an end thereof with a connector, and provided at other end thereof with a notch, the external electronic device is an expansion board conforming to M.2 interface standard protocol, when the connector of the external electronic device is inserted to the connection seat of the expandable interface board, the notch of the external electronic device will be aligned to the hole of the expandable interface board, a fixed member can pass through the notch of the external electronic device and the hole of the expandable interface board so as to fix the external electronic device on the expandable interface board.

In one embodiment of the present invention, wherein the expandable interface board further comprises a RAID module, the RAID module is connected to the controller and the connection seat, the external electronic device is a data storage device, the controller backs up the data signals stored in the data storage elements to the external electronic device by the using of the RAID module.

The present invention further provides an expandable interface board, conforming to M.2 interface standard protocol, comprising: a communication module; a data transmission interface comprising a plurality of first interface pins and a plurality of second interface pins; a controller connected to the communication module and the data transmission interface; and at least one connection seat connected to the controller, the connection seat is allowed for inserting an external electronic device, wherein the first interface pins are defined for transmitting data signals of the communication module, the second interface pins are defined for transmitting data signals of the external electronic device.

In one embodiment of the present invention, the communication module is a WiFi module, a Bluetooth module, a satellite navigation module, a near field communication module, or a wireless wide area network module.

BRIEF DESCRIPTION OF THE DRAWINGS

FIG. 8 is a front structural view of the interface board and other interface board being combined with each other according to another embodiment of the present invention.

DETAILED DESCRIPTION OF THE PREFERRED EMBODIMENTS

Figure 1B:
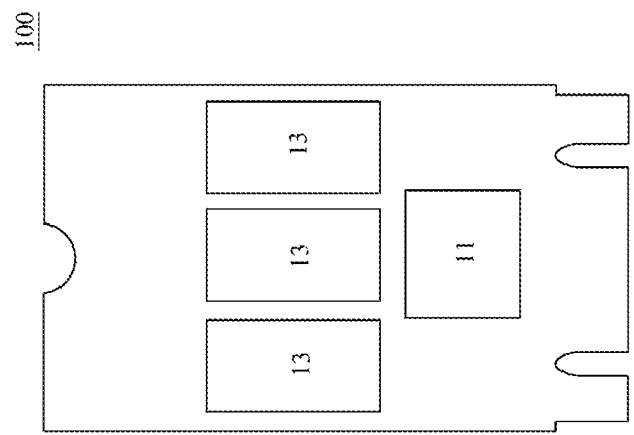
FIG. 1 (a) and FIG. 1 (b) are a front structural view and a back structural view of the interface board according to one embodiment of the present invention.
Figure 1A:
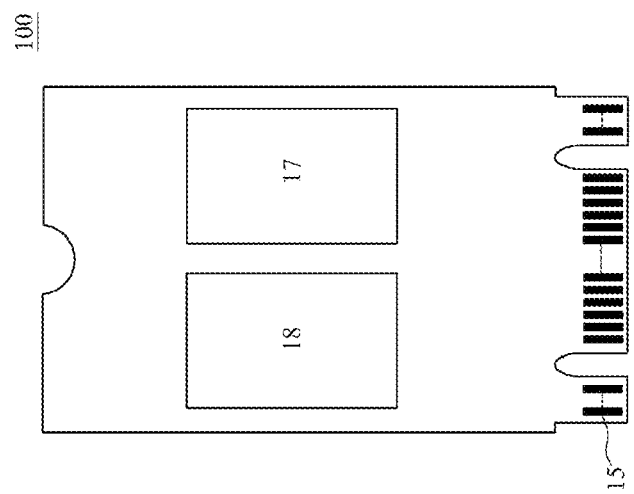
Figure 2:
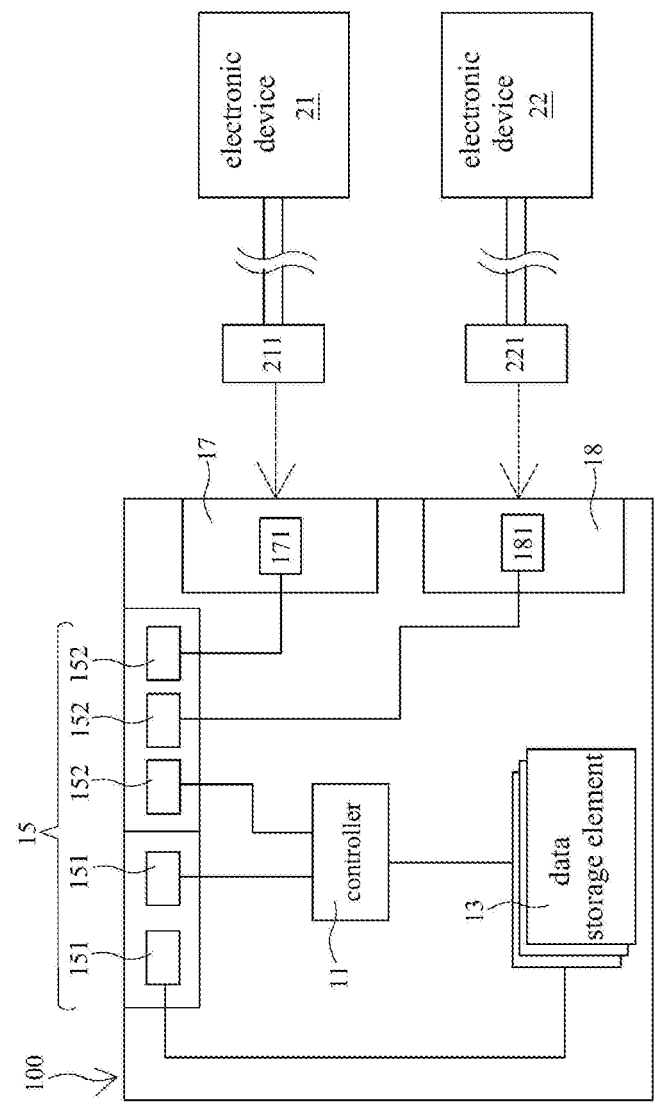
FIG. 2 is a schematic view of a circuit block of the interface board according to one embodiment of the present invention.

Referring to FIG. 1 (a) and FIG. 1 (b), there are shown a front structural view and a back structural view of the interface board according to one embodiment of the present invention, and referring to FIG. 2, there is shown a schematic view of a circuit block of the interface board according to one embodiment of the present invention. As shown in FIG. 1 (a), FIG. 1 (b), and FIG. 2, the interface board 100 of the present embodiment is an interface board conforming to M.2 interface standard protocol, and having pins of "B key" type, "M key" type, or "B+M key" type. The interface board 100 comprises a controller 11, a plurality of data storage elements 13, a data transmission interface 15, and at least one connection seat 17 and/or 18. The controller 11 and the data storage elements 13 are selectively configured on a surface (such as back surface) of the interface board 100, and the data transmission interface 15 and the connection seats 17, 18 are selectively configured on other surface (such as front surface) of the interface board 100. The controller 11 is electrically connected to the data storage elements 13, the data transmission interface 15, and the connection seats 17, 18. The data storage elements 13 are flash memory elements. The interface board 100 inserts into an electronic product by the data transmission interface 15 so as to be as a data storage device for the electronic product.

Wherein the connection seat 17/18 is a connection seat conforming to SATA interface standard protocol, USB interface standard protocol, NanoPitch (OCuLink) interface standard protocol, mSATA interface standard protocol, PCIe interface standard protocol, Slimline SAS interface standard protocol, or other interface standard protocol. For example, the connection seat 17 is a USB interface connection seat, and the connection seat 18 is a SATA interface connection seat. The connection seat 17/18 is able to be inserted by a connector 211/221 of an external electronic device 21/22, respectively. Taking some examples as an explanation, the electronic device 21 is a display device, the connector 211 is a USB interface connector, the electronic device 21 is able to insert into the USB interface connection seat 17 by the USB interface connector 211; otherwise, the electronic device 22 is a data storage device, the connector 221 is a SATA interface connector, the electronic device 22 is able to insert into the SATA interface connection seat 18 by the SATA interface connector 221.

The data transmission interface 15 comprises a plurality of first interface pins 151 and a plurality of second interface pins 152, and the interface connection seat 17/18 comprises a plurality of connection seat pins 171/181. The first interface pins 151 are the pins defined by the M.2 interface standard protocol already, and the second interface pins 152 is the reserved pins. The controller 11 and the data storage elements 13 are electrically connected to the corresponding first interface pins 151, respectively. The first interface pins 151 are defined, by the controller 11, for transmitting the data signals of the data storage elements 13. The controller 11 and the connection seat pins 171, 181 are electrically connected to the corresponding second interface pins 152, respectively. The reserved second interface pins 152 are defined, by the controller 11, for transmitting the data signals of the electronic devices 21, 22.

When the electronic devices 21, 22 are connected to the connection seats 17, 18 by the connectors 211, 221, the electronic devices 21, 22 and the electronic product applied by the interface board 100 can transmit the data signals each other via the connectors 211, 221, the connection seat pins 171, 181, and the second interface pins 152. By the configuration of the connection seats 17, 18, the interface board 100 of the present embodiment for storing data may be connected to at least one functional electronic device 21/22 so that the functions of the electronic product configured with the interface board 100 can be expanded.

Figure 3B:
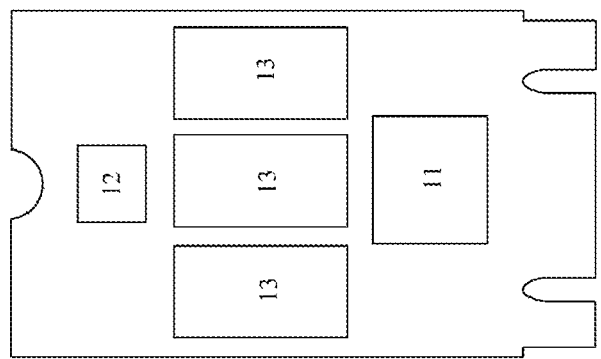
FIG. 3 (a) and FIG. 3 (b) are a front structural view and a back structural view of the interface board according to another embodiment of the present invention.
Figure 3A:
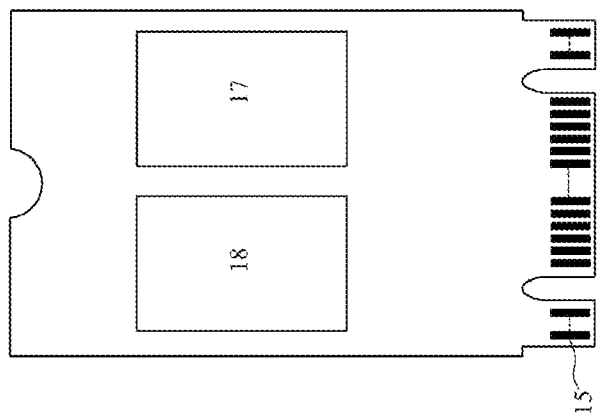
Figure 4:
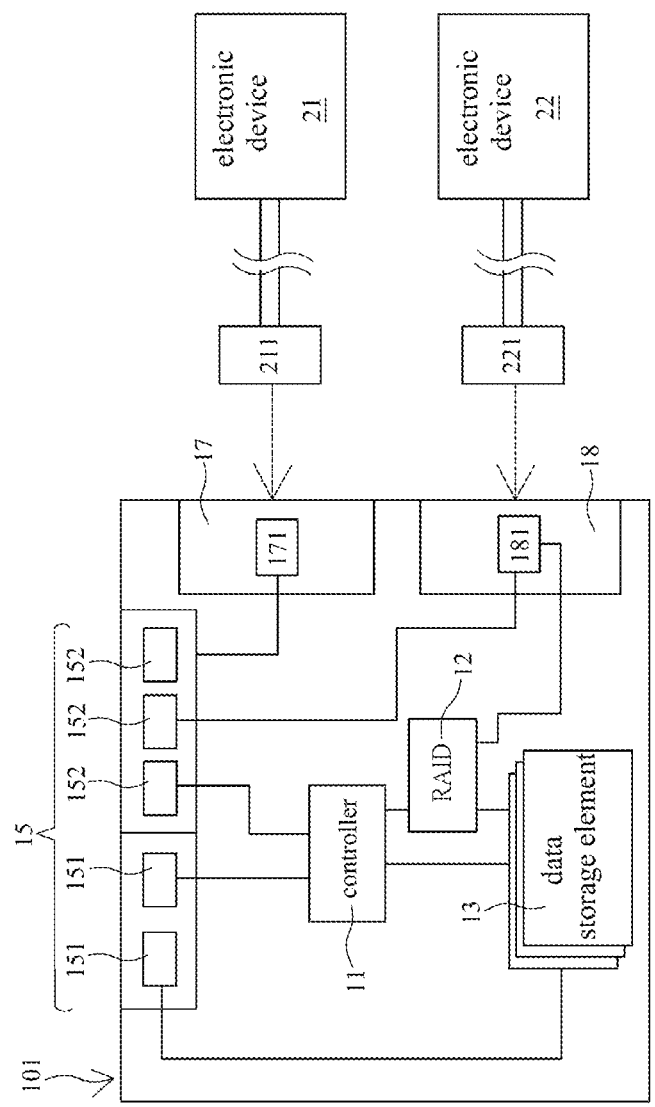
FIG. 4 is a schematic view of a circuit block of the interface board according to another embodiment of the present invention.

Referring to FIG. 3 (a) and FIG. 3 (B), there are shown a front structural view and a back structural view of the interface board according to another embodiment of the present invention, and referring to FIG. 4, there is shown a schematic view of a circuit block of the interface board according to another embodiment of the present invention. As shown in FIG. 3 (a), FIG. 3 (b), and FIG. 4, the interface board 101 of the present embodiment further comprises a RAID (Redundant Array of Independent Disks) module 12. The RAID module 12 is connected to the controller 11 and the connection seat 18. In the present embodiment, the controller 11 backs up the data signals stored in the data storage elements 13 to the external electronic device 22 (such as the data storage device) by the data backup function of the RAID module 12.

Figure 5B:
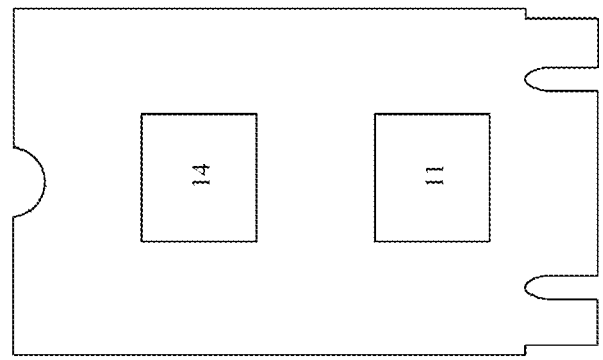
FIG. 5 (a) and FIG. 5 (b) are a front structural view and a back structural view of the interface board according to another embodiment of the present invention.
Figure 5A:
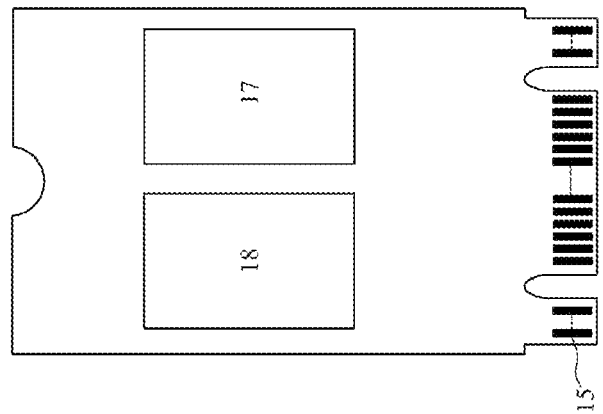
Figure 6:
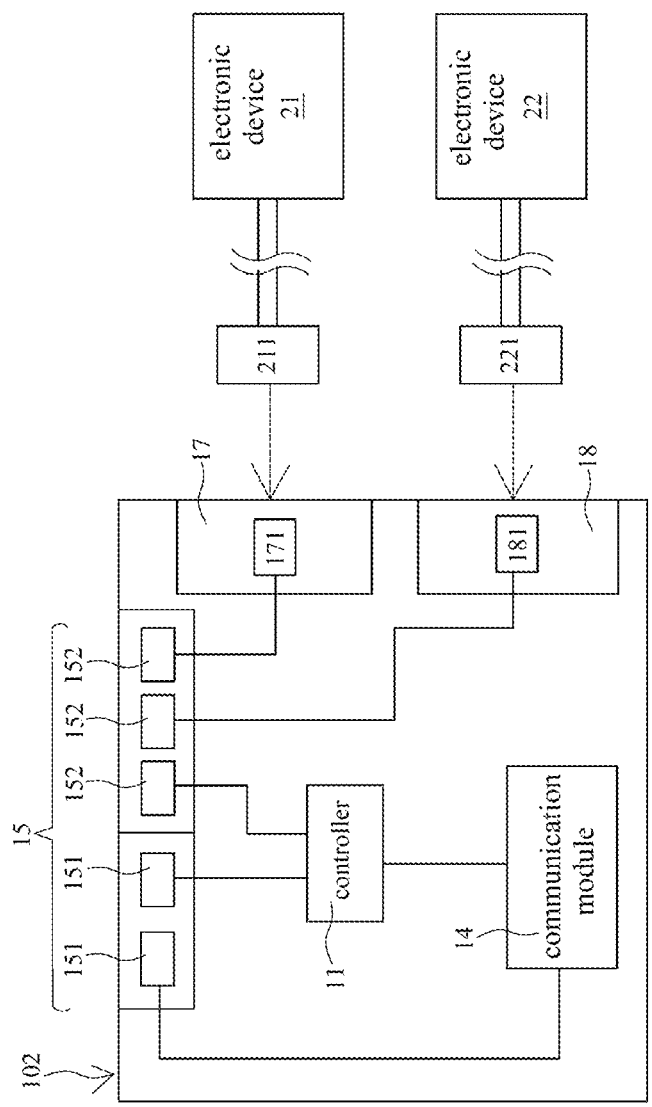
FIG. 6 is a schematic view of a circuit block of the interface board according to another embodiment of the present invention.

Referring to FIG. 5 (a) and FIG. 5 (B), there are shown a front structural view and a back structural view of the interface board according to another embodiment of the present invention, and referring to FIG. 6, there is shown a schematic view of a circuit block of the interface board according to another embodiment of the present invention. As shown in FIG. 5 (a), FIG. 5 (b), and FIG. 6, the interface board 102 of the present embodiment is an interface board conforming to M.2 interface standard protocol, and having pins of "A key" type, "E key" type, "A+E key" type, or "B key" type. The interface board 102 comprises a controller 11, a communication module 14, a data transmission interface 15, and at least one connection seat 17 and/or 18. The controller 11 and the communication module 14 are selectively configured on a surface (such as back surface) of the interface board 102, and the data transmission interface 15 and the connection seats 17, 18 are selectively configured on other surface (such as front surface) of the interface board 102. The controller 11 is electrically connected to the communication module 14, the data transmission interface 15, and the connection seats 17, 18. The communication module 14 is a WiFi module, a Bluetooth module, a satellite navigation module, a near field communication module, or a wireless wide area network module. The interface board 102 inserts to an electronic product by the data transmission interface 15 so as to be as a wireless signal transceiver for the electronic product.

Similarly, the connection seat 17/18 is a connection seat conforming to SATA interface standard protocol, USB interface standard protocol, NanoPitch (OCuLink) interface standard protocol, mSATA interface standard protocol, PCIe interface standard protocol, Slimline SAS interface standard protocol, or other interface standard protocol. The external electronic device 21/22 can insert into the connection seat 17/18 via the connector 211/221, respectively. The data transmission interface 15 comprises a plurality of first interface pins 151 and a plurality of second interface pins 152, and the interface connection seat 17/18 comprises a plurality of connection seat pins 171/181. The first interface pins 151 are the pins defined by the M.2 interface standard protocol already, and the second interface pins 152 is the reserved pins. The controller 11 and the data storage elements 13 are electrically connected to the corresponding first interface pins 151, respectively. The first interface pins 151 are defined, by the controller 11, for transmitting the data signals of the communication module 14. The controller 11 and the connection seat pins 171, 181 are electrically connected to the corresponding second interface pins 152, respectively. The reserved second interface pins 152 are defined, by the controller 11, for transmitting the data signals of the electronic devices 21, 22.

When the electronic devices 21, 22 are connected to the connection seats 17, 18 by the connectors 211, 221, the electronic devices 21, 22 and the electronic product applied by the interface board 102 can transmit the data signals each other via the connectors 211, 221, the connection seat pins 171, 181, and the second interface pins 152. By the configuration of the connection seats 17, 18, the interface board 102 of the present embodiment for communication transfer may be connected to at least one functional electronic device 21/22 so that the functions of the electronic product configured with the interface board 102 can be expanded.

Figure 7:
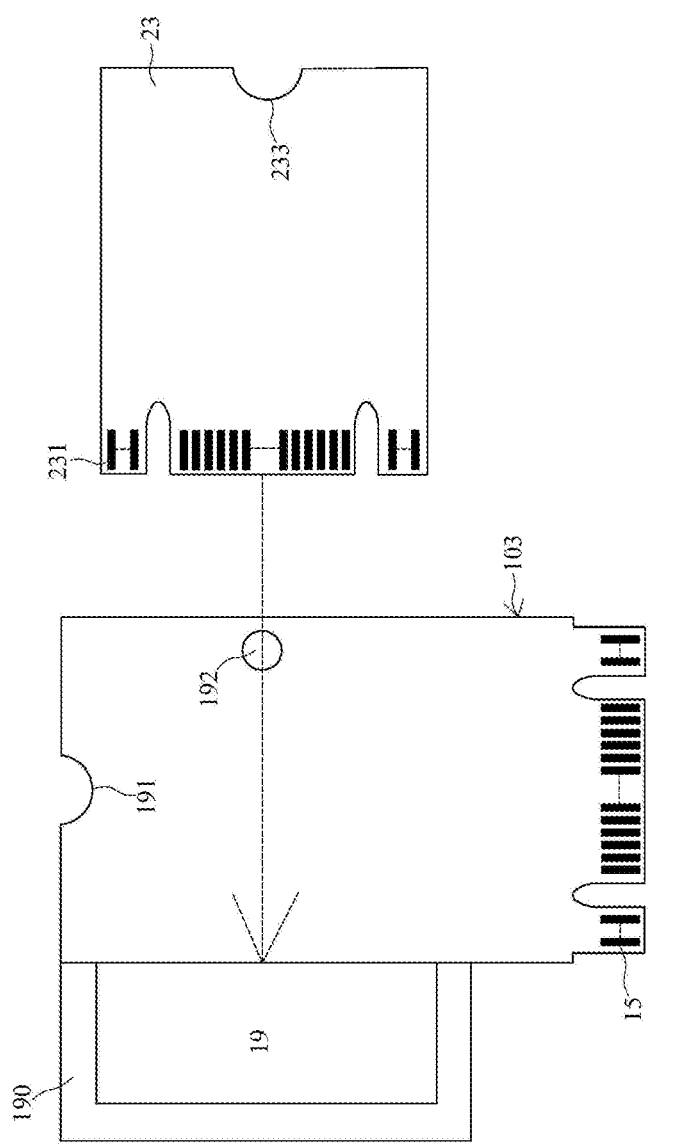
FIG. 7 is a front structural view of the interface board and other interface board being separated from each other according to another embodiment of the present invention.

Referring to FIG. 7, there is shown a front structural view of the interface board and other interface board being separated from each other according to another embodiment of the present invention, and referring to FIG. 8, there is shown a front structural view of the interface board and other interface board being combined with each other according to another embodiment of the present invention. The interface board 103 of the present embodiment is an interface board for storing data, or for communication transfer. As shown in FIG. 7 and FIG. 8, the interface board 103 is provided at an end (such as front end) thereof with the data transmission interface 15, and provided at other end (such rear end) thereof with a notch 191. Furthermore, the interface board 103 is provided at a side (such as left side) thereof with an expansion area 190, and provided at other side (such right side) thereof with a hole 192. A connection seat 19 conforming to M.2 interface standard protocol will be disposed on the expansion area 190.

In the present embodiment, the external electronic device 23 is another interface board conforming to M.2 interface standard protocol. The external electronic device 23 is provided at an end thereof with a connector 231 (such as data transmission interface conforming to M.2 interface standard protocol), and provided at other end thereof with a notch 233. When the connector 231 of the external electronic device 23 is inserted to the connection seat 19 of the interface board 103, the notch 233 of the external electronic device 23 will be aligned to the hole 192 of the interface board 103. A fixed member 30 can pass through the notch 233 of the external electronic device 23 and the hole 192 of the interface board 103 so as to fix the external electronic device 23 on the interface board 103. Thus, the electronic product can also be further extended with another interface board conforming to M.2 interface standard protocol through the interface board 103 of the present invention. Furthermore, another fixed member can also pass through the notch 191 of the interface board 103 so as to fix the interface board 103 on a circuit board of the electronic product.

The above disclosure is only the preferred embodiment of the present invention, and not used for limiting the scope of the present invention. All equivalent variations and modifications on the basis of shapes, structures, features and spirits described in claims of the present invention should be included in the claims of the present invention.

The invention claimed is:

1. An expandable interface board, conforming to M.2 interface standard protocol, applied in an electronic product, comprising:
    a plurality of data storage elements;
    a data transmission interface comprising a plurality of first interface pins and a plurality of second interface pins, wherein the interface board is inserted into the electronic product by the data transmission interface;
    a controller connected to the data storage elements and the data transmission interface; and
    at least one connection seat, connected to the controller, and comprises a plurality of connection seat pins connected to the second interface pins of the data transmission interface, the connection seat is provided for inserting an external functional electronic device, wherein the first interface pins are defined for transmitting data signals of the data storage elements, the connection seat pins and the second interface pins are defined for transmitting data signals of the external functional electronic device.

2. The expandable interface board according to claim 1, wherein the data storage elements are flash memory elements.

3. The expandable interface board according to claim 1, wherein the connection seat is a connection seat conforming to SATA interface standard protocol, USB interface standard protocol, NanoPitch (OCuLink) interface standard protocol, mSATA interface standard protocol, PCIe interface standard protocol, Slimline SAS interface standard protocol, or other interface standard protocol.

4. The expandable interface board according to claim 1, wherein the expandable interface board is further provided at a side thereof with an expansion area, and further provided at other side thereof with a hole, the connection seat of the expandable interface board is a connection seat conforming to M.2 interface standard protocol, and is disposed on the expansion area, the external electronic device is provided at an end thereof with a connector, and provided at other end thereof with a notch, the external electronic device is an expansion board conforming to M.2 interface standard protocol, when the connector of the external electronic device is inserted to the connection seat of the expandable interface board, the notch of the external electronic device will be aligned to the hole of the expandable interface board, a fixed member can pass through the notch of the external electronic device and the hole of the expandable interface board so as to fix the external electronic device on the expandable interface board.

5. The expandable interface board according to claim 1, wherein the expandable interface board further comprises a RAID module, the RAID module is connected to the controller and the connection seat, the external electronic device is a data storage device, the controller backs up the data signals stored in the data storage elements to the external electronic device by the using of the RAID module.

6. An expandable interface board, conforming to M.2 interface standard protocol, applied in an electronic product, comprising:
 a communication module;
 a data transmission interface comprising a plurality of first interface pins and a plurality of second interface pins, wherein the interface board is inserted into the electronic product by the data transmission interface;
 a controller connected to the communication module and the data transmission interface; and
 at least one connection seat, connected to the controller, and comprises a plurality of connection seat pins connected to the second interface pins of the data transmission interface, the connection seat is provided for inserting an external functional electronic device, wherein the first interface pins are defined for transmitting data signals of the communication module, the connection seat pins and the second interface pins are defined for transmitting data signals of the external functional electronic device.

7. The expandable interface board according to claim 6, wherein the communication module is a WiFi module, a Bluetooth module, a satellite navigation module, a near field communication module, or a wireless wide area network module.

8. The expandable interface board according to claim 6, wherein the connection seat is a connection seat conforming to SATA interface standard protocol, USB interface standard protocol, NanoPitch (OCuLink) interface standard protocol, mSATA interface standard protocol, PCIe interface standard protocol, Slimline SAS interface standard protocol, or other interface standard protocol.

9. The expandable interface board according to claim 6, wherein the expandable interface board is further provided at a side thereof with an expansion area, and further provided at other side thereof with a hole, the connection seat of the expandable interface board is a connection seat conforming to M.2 interface standard protocol, and is disposed on the expansion area, the external electronic device is provided at an end thereof with a connector, and provided at other end thereof with a notch, the external electronic device is another expandable interface board conforming to M.2 interface standard protocol, when the connector of the external electronic device is inserted to the connection seat of the expandable interface board, the notch of the external electronic device will be aligned to the hole of the expandable interface board, a fixed member can pass through the notch of the external electronic device and the hole of the expandable interface board so as to fix the external electronic device on the expandable interface board.

* * * * *